(12) United States Patent
Gear et al.

(10) Patent No.: US 9,268,390 B2
(45) Date of Patent: Feb. 23, 2016

(54) HUMAN PRESENCE DETECTION (75) Inventors: Gavin Michael Gear, Bothell, WA (US); Nikhil Subramanian, Seattle, WA (US); Kevin Phillip Paulson, Seattle, WA (US); Jason Scott, Redmond, WA (US); Milos Petrbok, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 689 days.

(21) Appl. No.: 12/968,246

(22) Filed: Dec. 14, 2010

(65) Prior Publication Data

US 2012/0146803 A1 Jun. 14, 2012

(51) Int. Cl.
*G08B 21/00* (2006.01)
*G06F 1/32* (2006.01)

(52) U.S. Cl.
CPC ............ *G06F 1/3231* (2013.01); *Y02B 60/1289* (2013.01)

(58) Field of Classification Search
USPC ......... 340/407.1, 407.2, 686.6; 345/173, 174, 345/179; 178/18.01, 18.03; 715/200; 700/17
See application file for complete search history.

(56) References Cited

U.S. PATENT DOCUMENTS

| | | | |
|---|---|---|---|
| 5,012,124 A | 4/1991 | Hollaway | |
| 5,396,443 A * | 3/1995 | Mese et al. | 713/321 |
| 5,841,425 A | 11/1998 | Zenz, Sr. | |
| 6,888,536 B2 | 5/2005 | Westerman et al. | |
| 6,922,147 B1 * | 7/2005 | Viksnins et al. | 340/573.1 |
| 8,294,047 B2 * | 10/2012 | Westerman et al. | 178/18.03 |
| 2003/0061524 A1 | 3/2003 | Casebolt et al. | |
| 2007/0024580 A1 | 2/2007 | Sands et al. | |
| 2007/0075965 A1 | 4/2007 | Huppi et al. | |
| 2008/0158172 A1 * | 7/2008 | Hotelling et al. | 345/173 |
| 2009/0102989 A1 | 4/2009 | Sakai et al. | |

(Continued)

FOREIGN PATENT DOCUMENTS

CN 1848127 A 10/2006
CN 101632057 A 1/2010

OTHER PUBLICATIONS

Raducanu, et al., "Human Presence Detection by Smart Devices", Retrieved at << http://citeseerx.ist.psu.edu/viewdoc/download-?doi=10.1.1.1.8515&rep=rep1&type=pdf >>, 2004, pp. 8.

(Continued)

*Primary Examiner* — George Bugg
*Assistant Examiner* — Edny Labbees
(74) *Attorney, Agent, or Firm* — Jim Banowsky; Judy Yee; Micky Minhas (57) ABSTRACT

Methods and a computing device are disclosed. A computing device may aggregate a number of inputs indicative of a presence or an absence of a human being within a proximity of the computing device. A source of at least one of the inputs may be a human presence sensor. A source of other inputs may provide an indication of the presence of a human being with corresponding estimated probabilities or corresponding estimated reliabilities which may provide an estimate of an accuracy of respective indications. In some embodiments, if any of the number of inputs indicate the presence of a human being, the computing device may determine that a human being is present. In other embodiments, if a corresponding estimated probability or reliability of an input is less than a predetermined value, then the input may be discarded when determining whether a human being is present.

24 Claims, 9 Drawing Sheets

(56) References Cited

U.S. PATENT DOCUMENTS

| | | |
|---|---|---|
| 2009/0265280 A1 | 10/2009 | Taneja et al. |
| 2010/0211904 A1 | 8/2010 | Yun et al. |
| 2012/0319992 A1* | 12/2012 | Lee .............................. 345/174 |
| 2013/0120306 A1* | 5/2013 | Furukawa .................... 345/173 |

OTHER PUBLICATIONS

"Sensors and Other Electronic Ingredients", Retrieved at << http://eskistudio.com/en/news/files/ESKI_Ingredients_2008.pdf >>, May 2008, pp. 12.

Waters et al., "A Wallable Macro Device", Retrieved at << http://www.hpl.hp.com/techreports/Compaq-DEC/CRL-99-6.pdf >>, Sep. 17, 1999, pp. 15.

"Sensor_Category_Biometric", Retrieved at << http://msdn.microsoft.com/en-us/library/dd318972%28VS.85%29.aspx >>, Retrieved Date: Sep. 22, 2010, pp. 2.

"International Search Report", Mailed Date: Jan. 12, 2012, Application No. PCT/US2010/061338, Filed Date: Dec. 20, 2010, pp. 9.

"First Office Action and Search Report Issued in Chinese Patent Application No. 201110436728.5", Mailed Date: Feb. 8, 2014, 13 Pages.

"Second Office Action Issued in Chinese Patent Application No. 201110436728.5", Mailed Date: Oct. 16, 2014, 6 Pages.

* cited by examiner

HUMAN PRESENCE DETECTION

BACKGROUND

Operating systems in modern computing devices implement logic to manage power states of various components and to lock-down access to the computing device. One part of the implemented logic concerns a proximity of a user with respect to a computing device.

Many existing computing devices rely solely on detecting input from a keyboard, a pointing device, a touch screen, or other input device by which a presence of a human being may be inferred. Each time a computing device detects the input, a timer may be started. The timer may be set for a time period, such as, for example, 15 minutes, 30 minutes, or another time period. Upon expiration of the timer, the computing device determines that a human being is not present at the computing device. However, a human being may be present and using a computing device with long periods of input inactivity. For example, a user may perform activities including, but not limited to, reading content or watching a video without providing any input. In such situations, the computing device may wrongly determine that the user is not present. As a result, various features of the computing device, which depend on making a determination regarding whether a human being is present or not present within a given proximity of the computing device, may not provide a consistent user experience.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In an embodiment consistent with the subject matter of this disclosure, a number of inputs may be received by a computing device. At least some of the inputs may indicate a presence or absence of the human being within a given proximity of the computing device. A source of one or more of the inputs may be a human presence sensor, which detects the presence or the absence of a human being within the given proximity of the computing device. In some embodiments, the human presence sensor may include a hybrid ambient light sensor with reflective infrared proximity and presence detection.

An inference of a presence or an absence of a human being may be made with respect to one or more others of the inputs. A source of the one or more others of the inputs may include, but not be limited to, an orientation change sensor, a keyboard, a pointing device, a touch screen, an interactive application, or any other source indicative of a presence of the human being.

In some embodiments, if any of the inputs indicate that a human being is present within the proximity of the computing device, then the computing device may make a determination that the human being is present.

In other embodiments, each of the inputs that indicate that a human being is present within the proximity of the computing device may have a corresponding estimated probability or a corresponding estimated reliability. If any of the inputs that indicate that a human being is present have a corresponding estimated probability or a corresponding estimated reliability that is less than a given value, then those inputs may be discarded when determining whether a human being is present or absent within the proximity of the computing device.

In some embodiments, some inputs may have a corresponding estimated probability or a corresponding estimated reliability that deteriorates over a period of time.

DRAWINGS

In order to describe the manner in which the above-recited and other advantages and features can be obtained, a more particular description is discussed below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

Overview

In various embodiments, a number of inputs may be received, which may indicate a presence or an absence of a human being within a given proximity of a computing device. At least one of the inputs is from a human presence sensor, which detects the presence or the absence of a human being within a given proximity of a computing device. In some embodiments, the human presence sensor may detect a human being by using reflective infrared light to perform reflective infrared proximity and presence detection. That is, in some embodiments, the human presence sensor may detect a human being by analyzing reflected infrared light.

Other sensors may also be employed including, but not limited to, an orientation change sensor for detecting a change in orientation of the computing device or a component thereof, such as a change from a portrait orientation to a landscape orientation, or vice versa. Other inputs may be received from a keyboard, a pointing device (including, but not limited to, a computer mouse, a joy stick or a touch screen), an interactive application, or any other source of input indicative of a presence of a human being. In this patent application, a touch input device refers to any device that requires a human being to touch the device to provide input.

Examples of a touch input device include, but are not limited to, a keyboard, a pointing device, and a touch screen.

In some implementations, if any of at least one human presence sensor indicates that a human being is present within a proximity of a computing device, then the computing device may determine that the human being is present. If, in addition to the at least one human presence sensor, one or more other inputs are provided that are indicative of a presence or an absence of the human being, then if any of the inputs indicate a presence of the human being, then the computing device may determine that the human being is present within the proximity of the computing device.

In some embodiments, each of the inputs may indicate a presence or an absence of a human being within a proximity of the computing device and a respective estimated probability of the presence or the absence of the human being. If any of the inputs indicate that the human being is present within the proximity of the computing device and the respective estimated probability of the presence of the human being is greater than or equal to a predetermined value, then the computing device may determine that the human being is present within the proximity of the computing device. Otherwise, the computing device may determine that the human being is not present.

If the computing device determines that the human being is present, the computing device may perform one or more first actions. If the computing device determines that the human being is not present, the computing device may perform one or more second actions.

In a variation of the embodiments, a respective estimated probability regarding one or more inputs indicating a presence of a human being may deteriorate over a given period of time.

In another variation of the embodiments, one or more inputs may indicate a presence or absence of a human being with a reliability which may deteriorate over a given period of time. The one or more inputs that have a reliability less than a threshold value may be discarded when determining whether the human being is present or absent.

Exemplary Computing Device

Figure 1:
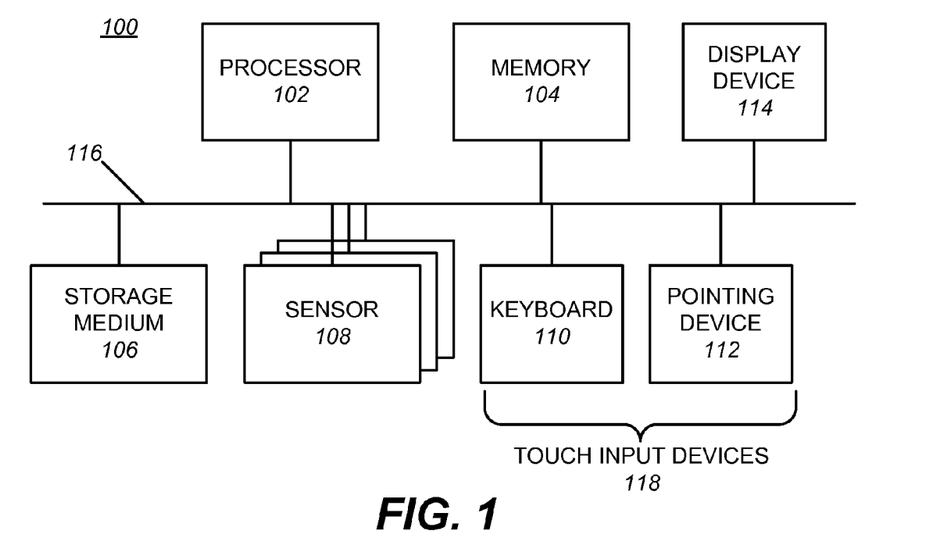
FIG. 1 is a block diagram of an exemplary computing device which may implement embodiments consistent with the subject matter of this disclosure.

FIG. 1 is a block diagram of an exemplary computing device 100, which may be employed to implement one or more embodiments consistent with the subject matter of this disclosure. Exemplary computing device 100 may be a personal computer (PC), a notebook computer, a handheld computing device, a server, or other type of computing device. Exemplary computing device 100 may include a processor 102, a memory 104, a storage medium 106, one or more sensors 108, a keyboard 110, a pointing device 112, a display device 114 and a communication bus 116 connecting processor 102 with memory 104, storage medium 106, one or more sensors 108, keyboard 110, pointing device 112 and display device 114. Some embodiments of computing device 100 may further include a hardware logic component, including, but not limited to, an application specific integrated circuit (ASIC) (not shown) and/or a field programmable gate array (FPGA) (not shown) that may be combined with instructions in memory 104 to cause computing device 100 to perform a method.

Processor 102 may include one or more conventional processors that interpret and execute instructions. Memory 104 may include a Random Access Memory (RAM), a Read Only Memory (ROM), and/or other type of dynamic or static storage medium that stores information and instructions for execution by processor 102. The RAM, or the other type of dynamic storage medium, may store instructions as well as temporary variables or other intermediate information used during execution of instructions by processor 120. The ROM, or the other type of static storage medium, may store static information and instructions for processor 102.

Storage medium 106 may include any type of medium capable of storing information and/or instructions in a machine-readable form.

One or more sensors 108 may include, but not be limited to, a human presence sensor and an orientation sensor. The orientation sensor may include an accelerometer sensor which detects a change in orientation of computing device 100 or a component of computing device 100 including, but not limited to, a display device of computing device 100. For example, the orientation sensor may sense a change in orientation from a portrait orientation to a landscape orientation or vice versa. The human presence sensor may include, but not be limited to, a hybrid ambient light sensor with reflective infrared proximity and presence detection, a capacitive proximity sensor, or a short-range wireless transceiver. An example of a short-range wireless transceiver may include, but not be limited to, a Bluetooth® transceiver (Bluetooth is a registered trademark of Bluetooth Sig., Inc. of Bellevue, Wash.). When using the short-range wireless transceiver as a human presence sensor, a human being may carry a short-range wireless transmitter such that the short-range wireless transceiver detects a signal transmitted from the short-range wireless transmitter when the human being is within a given proximity of computing device 100.

Keyboard 110 may be a conventional keyboard or a soft keyboard displayed on a touch screen. Pointing device 112 may be any device by which a user may move a cursor on a display screen. Examples of pointing device 112 may include, but not be limited to, a computer mouse, a touchpad and a joystick. A touch input device 114 may include any device that a user touches in order to provide input to a computing device. Examples of touch input devices 114 may include, but not be limited to, keyboard 110, pointing device 112, and a touch screen (not shown).

Although FIG. 1 only shows three sensors 108, other embodiments of a computing device may include one sensor 108, two sensors 108, or many sensors 108, as well as other types of input devices.

Exemplary Embodiments

Figure 2:
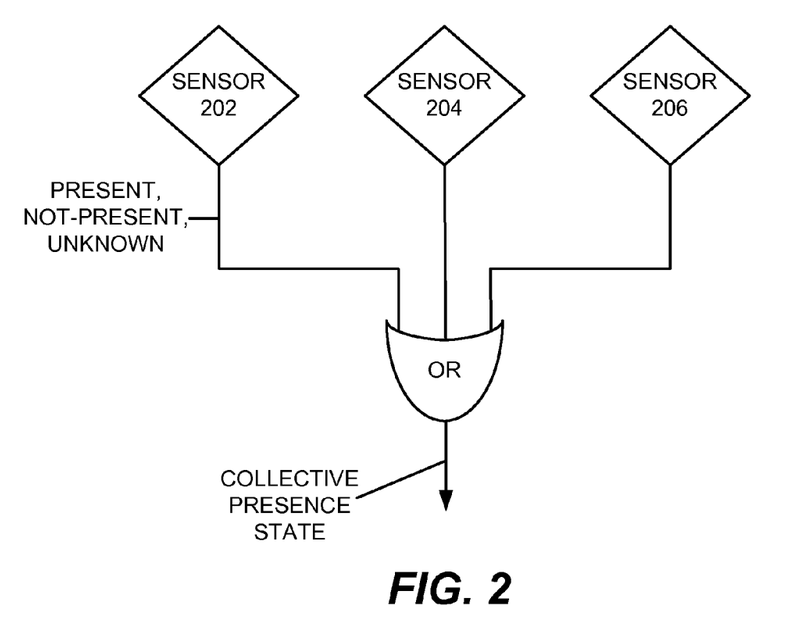
FIG. 2 is a block diagram of a portion of an exemplary embodiment having three human presence sensors.

FIG. 2 illustrates an exemplary embodiment having three human presence sensors 202, 204, 206. In the exemplary embodiment of FIG. 2, at least one of human presence sensors 202, 204, 206 may be a hybrid ambient light sensor with reflective infrared proximity and presence detection. Each of sensors 202, 204, 206, may be in a sensor state of "Ready" or "Not Ready". If a sensor is in the "Ready" sensor state, then the sensor may provide a human presence indication of "Present" or "Not Present". If the sensor is in the "Not Ready" sensor state, then the sensor may provide a human presence indication of "Unknown". A sensor having a sensor state of "Not Ready" may not be used to determine whether a human being is present or not present. Rows of Table 1 illustrate possible sensor states and human presence indications with respect to human presence sensors, as discussed above.

TABLE 1

| Sensor State | User Presence Indication |
| --- | --- |
| Ready | Present |
| Ready | Not Present |
| Not Ready | Unknown |

In the embodiment of FIG. 2, if any inputs from sensors 202, 204, 206 provide an indication of "Present", then an aggregated or collective presence state output may provide an indication of "Present".

Figure 3:
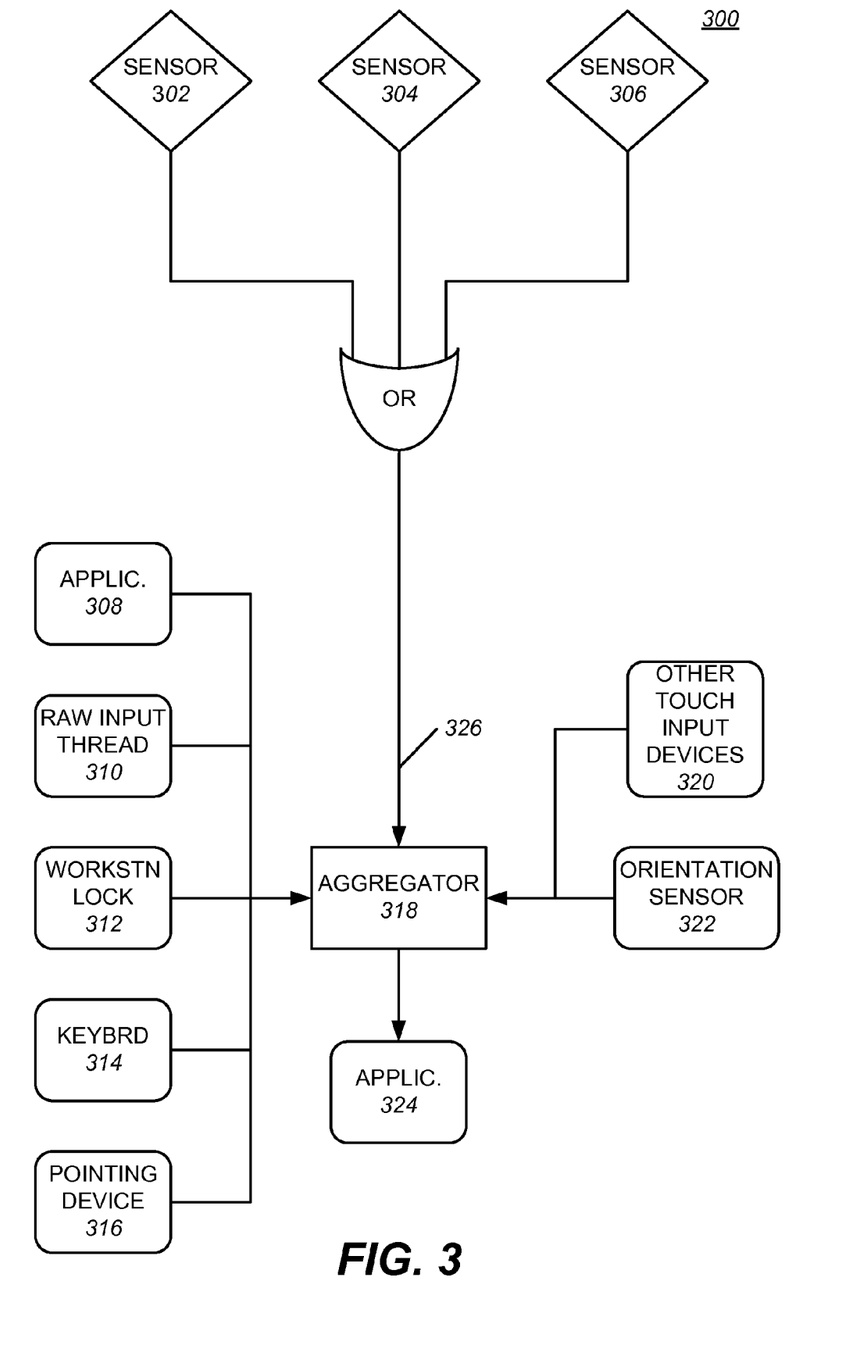
FIG. 3 is a block diagram of a portion of another exemplary embodiment having three human presence sensors, an orientation sensor, and other inputs indicative of a presence or an absence of a human being within a proximity of a computing device.

FIG. 3 illustrates another exemplary embodiment 300, which includes human presence sensors 302, 304, 306, an aggregator 318, inputs from an application 308, a raw input thread 310, a workstation lock 312, a keyboard 314, a pointing device 316, other touch input device 320, and an orientation sensor 322.

A collective presence state 326 from human presence sensors 302, 304, 306 may be provided to aggregator 318. If any one of human presence sensors 302, 304, 306 indicate that a human being is present, then collective presence state 326 may indicate that the human being is present.

Inputs from application 308, raw input thread 310, keyboard 314, pointing device 316, other touch input devices 320, and an orientation sensor 322 may indicate a presence of a human being. If any one of collective presence state 326 and the inputs from application 308, raw input thread 310, workstation lock 312, keyboard 314, pointing device 316, other touch input device 320, or orientation sensor 322 indicate that a human being is present, then aggregator 318 may determine that a human being is present and may provide an input to an application 324 informing application 324 that the human being is present. Application 324 may cause one or more actions to be performed by a computing device upon being informed that the human being is present. In another embodiment, application 324 may cause one or more actions to be performed by the computing device upon being informed that the human being is not present.

In some embodiments, application 308 may be an interactive application. In other embodiments, application 308 may be another type of application including, but not limited to, a media player. Raw input thread 310 may include input from a user via any type of input device. Keyboard 314 may include, but not be limited to, a conventional keyboard or a soft keyboard displayed on a touch screen. Pointing device 316 may include, but not be limited to, a computer mouse, a touchpad, a joystick, or a finger or a stylus on a touch screen. Orientation sensor 322 may include an accelerometer for detecting a change in orientation, such as, for example, portrait to landscape, or landscape to portrait.

Each of the inputs to aggregator 318 may have a corresponding estimated probability or estimated reliability. For example, an estimated probability or an estimated reliability with respect to human presence sensors 302, 304, 306 indicating "Present" may be 100%. That is, in this embodiment, an estimated probability, or an estimated reliability with respect to any one of human presence sensors 302, 304, 306 correctly indicating that a human being is present may be 100%. However, an estimated probability, or an estimated reliability with respect to one or more other inputs indicating a presence of a human being may initially be 100%, but may deteriorate over a given time period, as will be explained in more detail later.

Workstation lock 312 may include, but not be limited to, a button, a switch, a soft button on a display, which when pressed or selected causes a computing device to be locked until, for example, a certain password is provided or another action is performed by a user. In some embodiments, workstation lock 312 may include a remote control signal or an application input, which, when received, causes a computing device to be locked until, for example, a certain password is provided or another action is performed by a user. When workstation lock 312 is activated to lock the computing device, workstation lock 312 may provide an input to aggregator 318 indicating that a human being is not present and an estimated probability or an estimated reliability with respect to the input from workstation lock 312 may initially be 100%, but may deteriorate over a period of time.

Although FIG. 3 illustrates an embodiment with three human presence sensors 302, 304, 306, as well as other inputs, other embodiments may have a different number of human presence sensors or other types of inputs.

Figure 4:
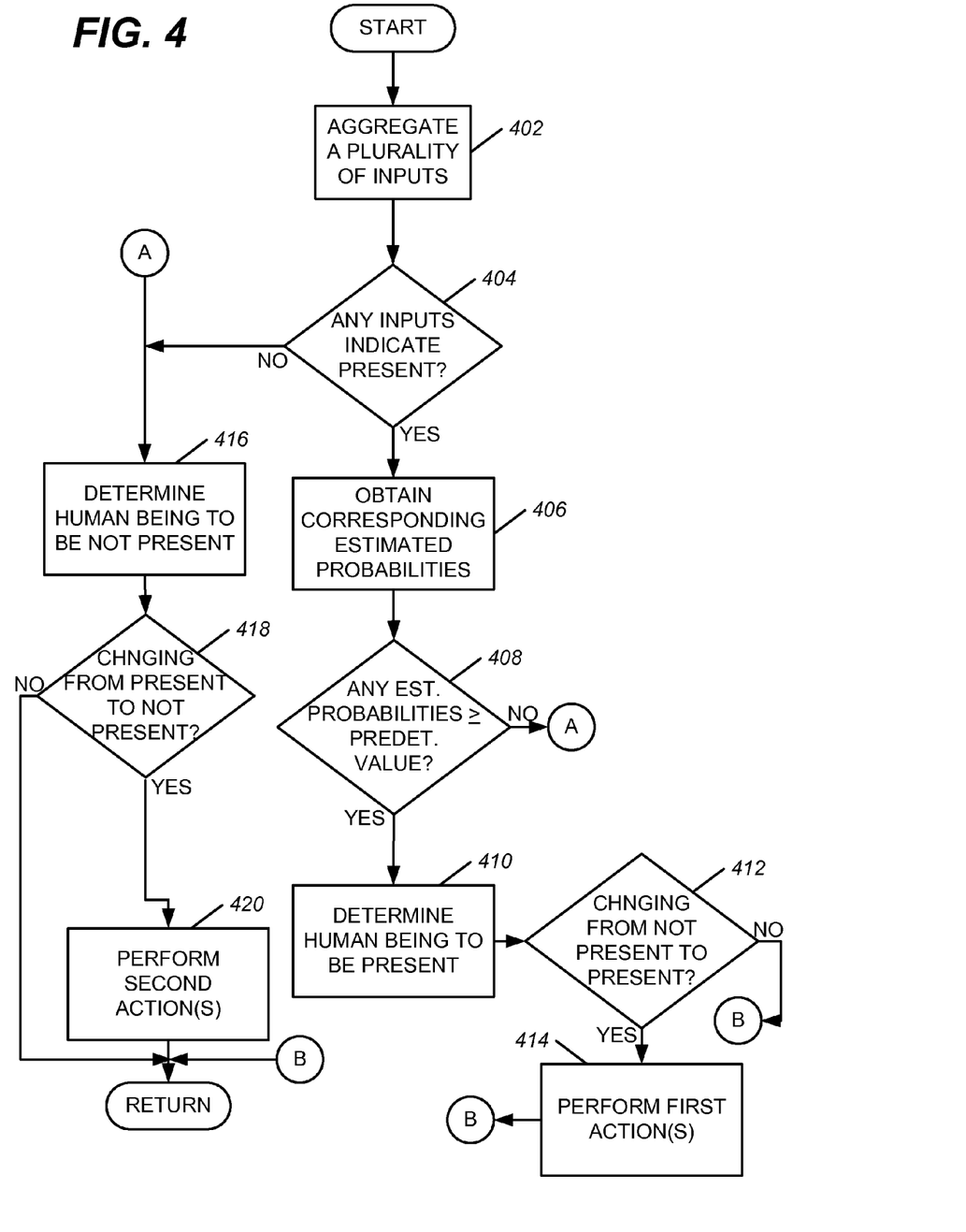
FIGS. 4-10 are flowcharts illustrating exemplary processing which may be performed by a computing device in various embodiments consistent with the subject matter of this disclosure.

FIG. 4 is a flowchart illustrating exemplary processing for determining whether a human being is present within a proximity of a computing device in an embodiment consistent with the subject matter of disclosure. The process may be implemented by the computing device and may begin with the computing device aggregating a number of inputs which may indicate a presence or an absence of a human being within a given proximity of the computing device (act 402). One or more of the inputs may be from a human presence sensor. Other inputs may be from a number of sources including, but not limited to, an application, a raw input thread, a keyboard, a pointing device, an orientation sensor, or any touch input device. In some embodiments, the human presence sensor may include a hybrid ambient light sensor with either reflective infrared proximity and presence detection or a capacitive proximity sensor for human presence detection.

The computing device may then determine whether any of the inputs indicate that a human being is present (act 404). If any of the inputs indicate that a human being is present, then the computing device may obtain corresponding estimated probabilities with respect to any of the inputs that indicate a human being is present (act 406). In this embodiment, when an input first indicates that a human being is present, a corresponding estimated probability with respect to the input may be 100% or another value. Some inputs, including, but not limited to, inputs from hybrid ambient light sensors with reflective infrared proximity presence detection, may always have a respective corresponding estimated probability of 100% when the inputs indicate that a human being is present. Other inputs, including, but not limited to, inputs from a keyboard, a pointing device, a raw input thread, an orientation sensor, or an interactive application, may initially have a respective corresponding estimated probability of 100% when the inputs first indicate that a human being is present. However, the estimated probability of the other inputs may deteriorate over a period of time.

The computing device may then determine whether any of the estimated probabilities, with respect to the inputs that indicate a human being is present, are greater than or equal to a predetermined value, such as, for example, 75%, 80%, or another value (act 408). If any of the estimated probabilities are greater than or equal to the predetermined value, then the computing device may determine that a human being is present (act 410).

The computing device may then determine whether a transition is being made with respect to changing from a "Not Present" indication to a "Present" indication (act 412). If the transition is not being made, then the procedure may be completed. Otherwise, the computing device may behave in a predetermined manner, including, but not limited to, performing one or more first actions (act 414). In some embodiments, an indication that a human being is present may be provided to an application executing on the computing device. When the application receives the indication that a human being is present, the application may perform the one or more first actions. The one or more first actions may include, but not be limited to, locking a workstation, such that a user may not be permitted to enter any input until a particular user action is taken, such as, for example, entering a password or another particular user action.

If, during act 404, no inputs are determined to indicate that a human being is present, or during act 408, no estimated probabilities are greater than or equal to the predetermined value, then the process device may determine that a human being is not present (act 416). The computing device may then determine whether a transition is being made with respect to changing from a "Present" indication to a "Not Present" indication (act 418). If the transition is not being made, then the process may be complete. Otherwise, the computing device may behave in a second predetermined manner, including, but not limited to, performing one or more second actions (act 420). In some embodiments, an indication that a human being is not present may be provided to a second application executing on the computing device. When the second application receives the indication that a human being is not present, the second application may perform the one or more second actions. In some embodiments, the one or more second actions may include, but not be limited to, prompting a user to perform an action for unlocking the computing device.

Figure 5:
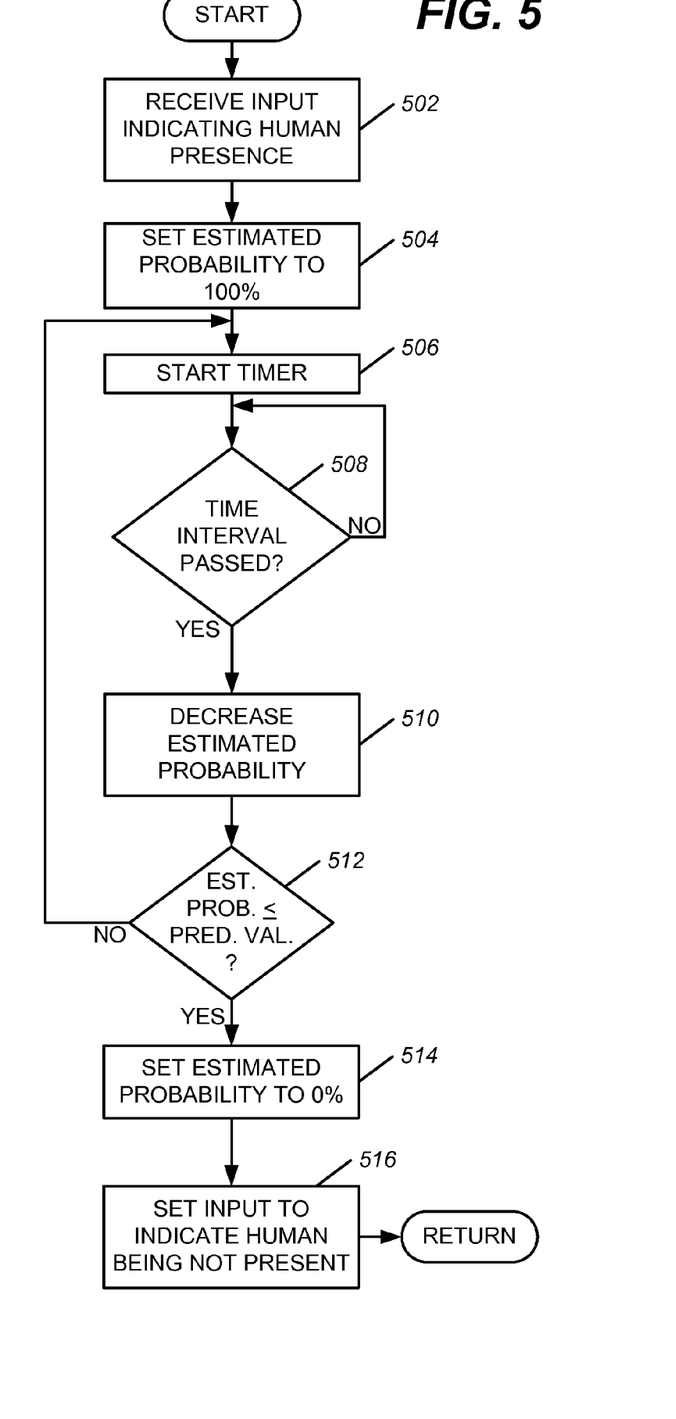

FIG. 5 is a flowchart illustrating an exemplary process for deteriorating, over a time period, an estimated probability with respect to one of the inputs, indicating that a human being is present. The process may begin with a computing device receiving an input indicating that a human being is present (act 502). The computing device may set a corresponding estimated probability, with respect to a presence of a human being, to 100% (act 504).

The computing device may then start a timer to time a predetermined timer interval (act 506). The timer interval may be 30 seconds, 1 minute, or another timer interval. The computing device may then determine whether the timer interval has passed (i.e., the timer has expired) (act 508). When the computing device determines that the timer has expired, the computing device may decrease the corresponding estimated probability by a predetermined amount, such as, for example, 5%, 10%, or another value (act 510). The computing device may then determine whether the corresponding estimated probability is less than or equal to a predetermined value, such as, for example, 75%, 50%, or another predetermined value (act 512). If the computing device determines that the estimated probability is not less than or equal to the predetermined value, then acts 506-512 may be performed again.

If, during act 512, the computing device determines that the corresponding estimated probability is less than or equal to the predetermined value, then the computing device may set the estimated probability, with respect to the detecting a presence of a human being, to 0% (act 514) and may set the indication associated with the input to indicate that a human being is not present (act 516). The process may now be completed.

Figure 6:
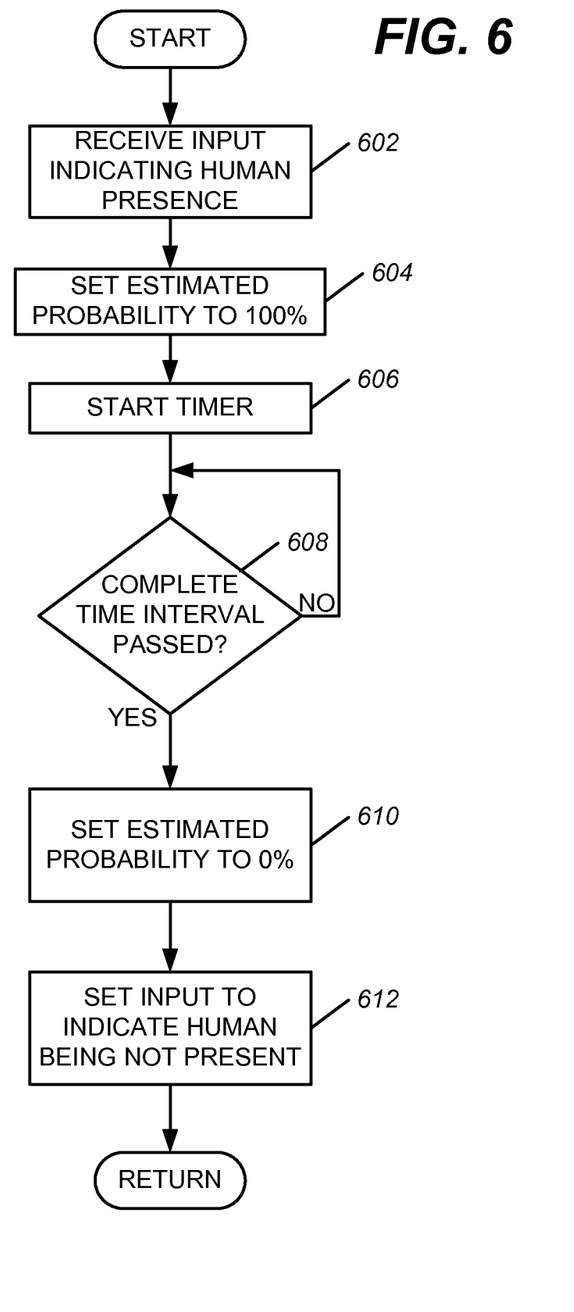

FIG. 6 illustrates exemplary processing with respect to a variation of the procedure illustrated by FIG. 5. The process may begin with the computing device receiving an input indicating that a human being is present (act 602). The computing device may then set a corresponding estimated probability, with respect to a presence of a human being, to 100% (act 604). The computing device may then start a timer for a predetermined time interval, such as, for example, five minutes, 15 minutes, 30 minutes, or another predetermined time interval (act 606).

During act 608, the computing device may determine whether the timer has expired, indicating that the predetermined time interval has passed. If the computing device determines that the predetermined time interval has passed, the computing device may set the estimated probability, with respect to the presence of a human being, to 0% (act 610). The computing device may then set the indication associated with the input to indicate that a human being is not present (act 612). The process may now be completed.

Figure 7:
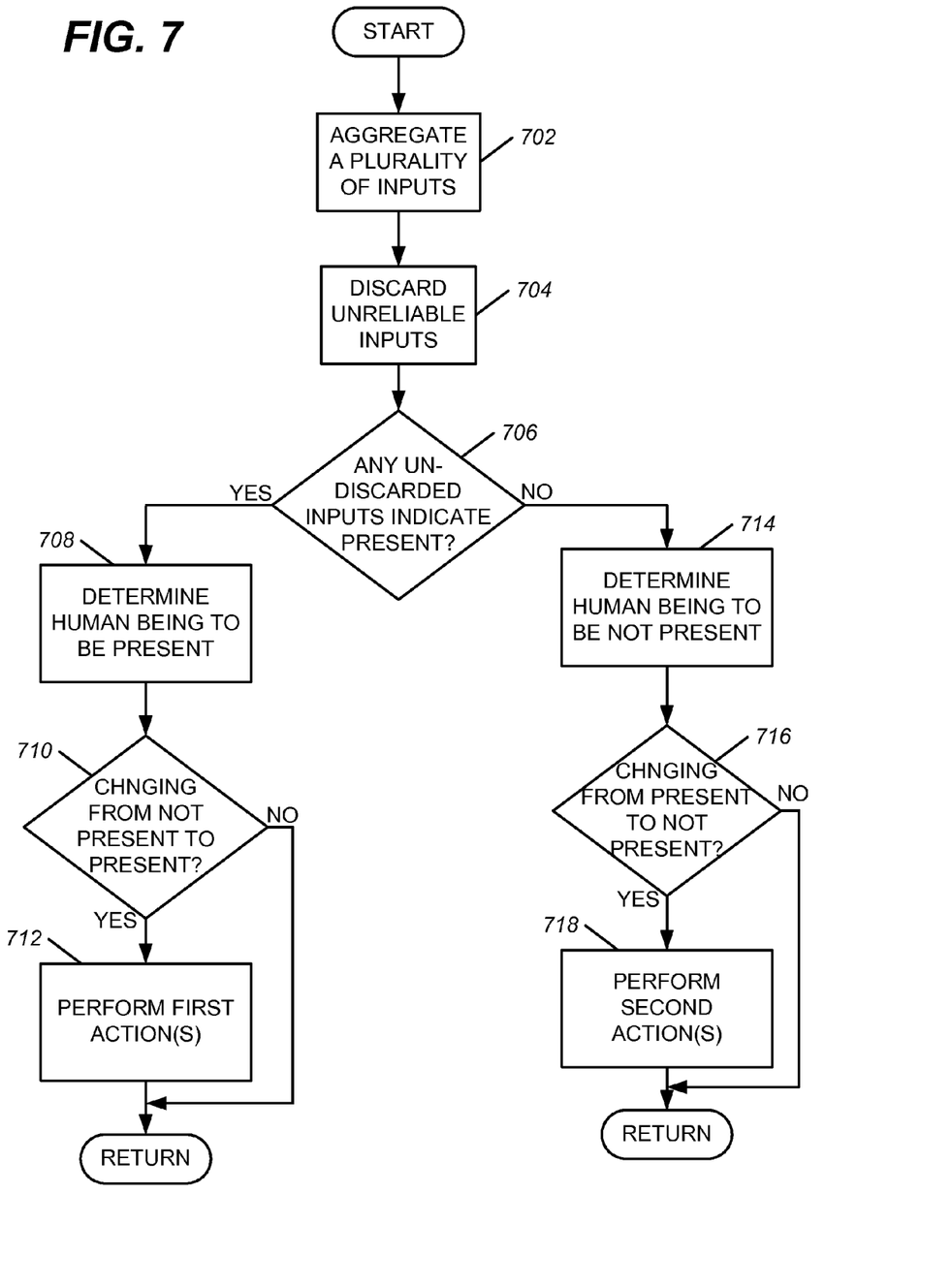

FIG. 7 is a flowchart illustrating exemplary processing for determining whether a human being is present within proximity of a computing device in another embodiment consistent with the subject matter of this disclosure. The process may be implemented on the computing device and may begin with the computing device aggregating a number of inputs which may indicate a presence or an absence of a human being within a given proximity of the computing device (act 702). One or more of the inputs may be from a human presence sensor. Other inputs may be from a number of sources including, but not limited to, an application, a raw input thread, a keyboard, a pointing device, an orientation sensor, or any touch input device. In some embodiments, the human presence sensor may include a hybrid ambient light sensor with reflective infrared proximity and presence detection or a capacitive proximity sensor for human presence detection.

The computing device may then discard unreliable inputs (act 704). In this embodiment, each of the inputs may have a corresponding reliability value with respect to either a presence of a human being or an absence of a human being. An unreliable input may be an input with a reliability value that is less than a threshold value. The threshold value may be 50%, 60%, or some other threshold value.

After discarding the unreliable inputs, the computing device may then determine whether any of the un-discarded inputs indicate that a human being is present (act 706). If at least one of the inputs indicate that a human being is present, then the computing device may determine that a human being is present (act 708). The computing device may then determine whether a transition is occurring from an indication of "Not Present" to an indication of "Present" (act 710). If the computing device determines that the transition is occurring, then the computing device may perform one or more first actions (act 712). The one or more first actions may include, but not be limited to, backlighting a display screen, or powering on a storage medium device. The process may then be completed.

If, during act 706 the computing device determines that no un-discarded input indicates that a human being is present, then the computing device may determine that a human being is not present (act 714). The computing device may then determine whether a transition is occurring from an indication of "Present" to an indication of "Not Present" (act 716). If the computing device determines that the transition from an indication of "Present" to an indication of "Not Present" is occurring, then the computing device may perform one or more second actions (act 718). The one or more second actions may include, but not be limited to, locking the computing device such that no input may be entered, turning off a display device, or powering off a storage medium device. The process may then be completed.

In one embodiment, an application may perform the one or more first actions when an input is provided to an application indicating a transition from the "Not Present" indication to the "Present" indication. Similarly, the application or a second application may perform the one or more first actions when an input is provided to the application or the second application indicating a transition from the "Present" indication to the "Not Present" indication.

Figure 8:
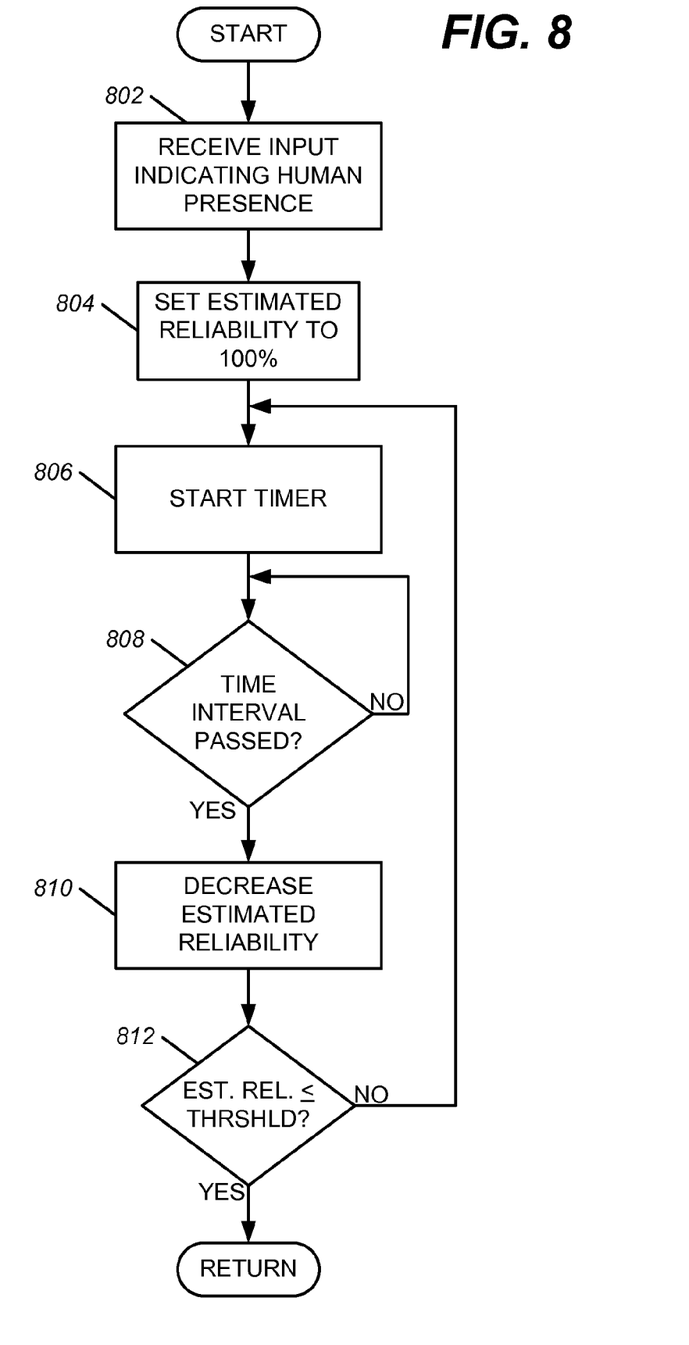

FIG. 8 is a flowchart illustrating exemplary processing performed by a computing device in an embodiment consistent with the subject matter of this disclosure. The exemplary processing decreases an estimated reliability value with respect to an input that indicates that a human being is present. In this embodiment, only some of the inputs may have their corresponding estimated reliability values decreased over time. Other inputs, including, but not limited to, at least some human presence sensors, may not have their corresponding estimated reliability values decreased over time.

The processing may begin with a computing device receiving an input indicating a that a human being is present (act 802). In this exemplary process, the input is from a source which has decreasing reliability over time. In some embodiments, the source of the input having a decreasing reliability may include, but not be limited to, a raw input thread, a touch input device, or an orientation sensor.

After receiving the input, the computing device may set an estimated reliability associated with the received input to 100% or another value (act 804). The computing device may then start a timer for a predetermined timer interval (act 806). The timer interval may be 10 seconds, 1 minute, or another timer interval. The computing device may then determine whether the timer interval has passed (i.e., the timer expired) (act 808).

If the timer interval has passed, then the computing device may decrease the estimated reliability associated with the received input by a given amount (act 810). The given amount may be 5%, 10%, 15%, or some other value. The computing device may then determine whether the estimated reliability associated with the received input is less than or equal to a threshold value (act 812). The threshold value is a value, such that when the estimated reliability is less than or equal to the threshold value, the associated input may be considered to be unreliable. In some embodiments, the threshold value may be configurable.

If the computing device determines that the estimated reliability is less than or equal to the threshold value, then the process is completed. Otherwise, acts 806-812 may again be performed to start the timer and decrease the estimated reliability by the given amount upon expiration of the timer.

Figure 9:
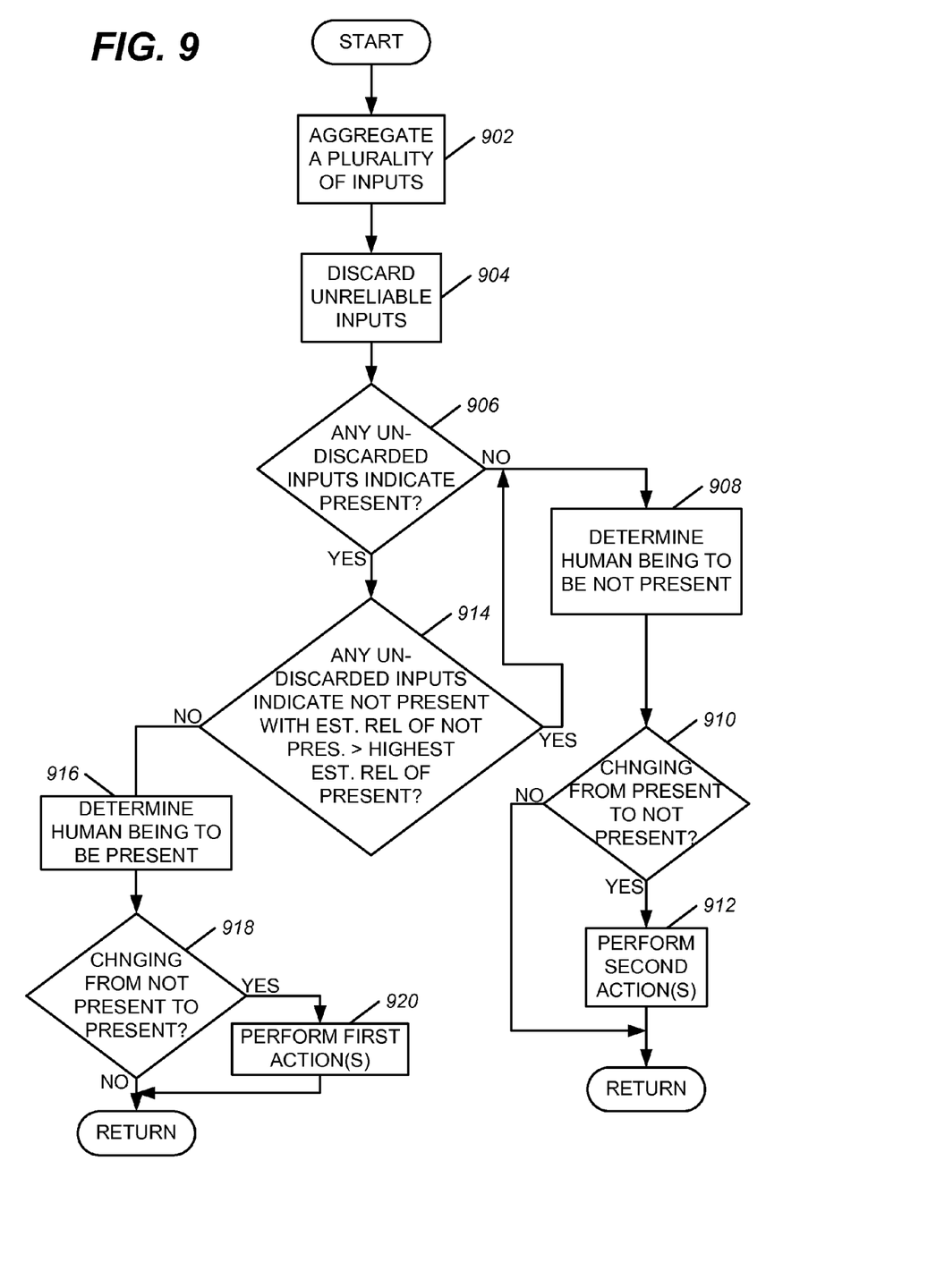

FIG. 9 is a flowchart that illustrates exemplary processing of aggregated inputs in another embodiment consistent with the subject matter of this disclosure. The process may begin with a computing device aggregating a number of inputs which may indicate a presence or an absence of a human being within a given proximity of the computing device (act 902). One or more of the inputs may be from a human presence sensor. Other inputs may be from a number of sources including, but not limited to, an application, a raw input thread, a keyboard, a pointing device, an orientation sensor, or any touch input device. In some embodiments, the human presence sensor may include a hybrid ambient light sensor with reflective infrared proximity and presence detection.

The computing device may discard unreliable inputs (act 904). In this embodiment, each of the inputs that indicate that a human being is either present or not present may have a corresponding reliability value as indicated by a respective input. An unreliable input may be an input with a reliability value that is less than a threshold value. The threshold value may be 50%, 60%, or some other threshold value.

After discarding the unreliable inputs, the computing device may then determine whether any of the un-discarded inputs indicate that a human being is present (act 906). If, during act 906, the computing device determines that none of the un-discarded inputs indicate that a human being is present, then the computing device may determine that a human being is not present (act 908). The computing device may then determine whether a transition is being made from detecting that a human being is present to the detecting that a human being is not present (act 910). If the computing device determines that the transition is being made, then the computing device may perform one or more second actions (act 912). As mentioned earlier, a "Not Present" indication may be provided to a second application, which may then perform the one or more second actions (act 912). The process may then be completed.

If, during act 906, the computing device determines that at least one of the inputs indicate that a human being is present, then the computing device may determine whether any un-discarded inputs that indicate a human being is not present have a higher estimated reliability then one of the inputs that indicate that a human being is present with an estimated reliability greater than or equal to any estimated reliability of any other of the inputs indicating that a human being is present (act 914). If so, then act 908-912 may be performed by the computing device.

If, during act 914, the computing device determines that none of the un-discarded inputs that indicate a human being is not present have an estimated reliability greater than the highest estimated reliability with respect to any of the inputs that indicate that a human being is present, then the computing device may determine that a human being is present (act 916). The computing device may then determine whether a transition is being made from determining that a human being is not present to determining that a human being is present (act 918). If, the computing device determines that the transition is being made from determining that a human being is not present to determining that a human being is present, then the computing device may perform one or more first actions (act 920). As mentioned earlier, a "Present" indication may be provided to an application, which may then perform the one or more first actions. The process may now be completed.

Figure 10:
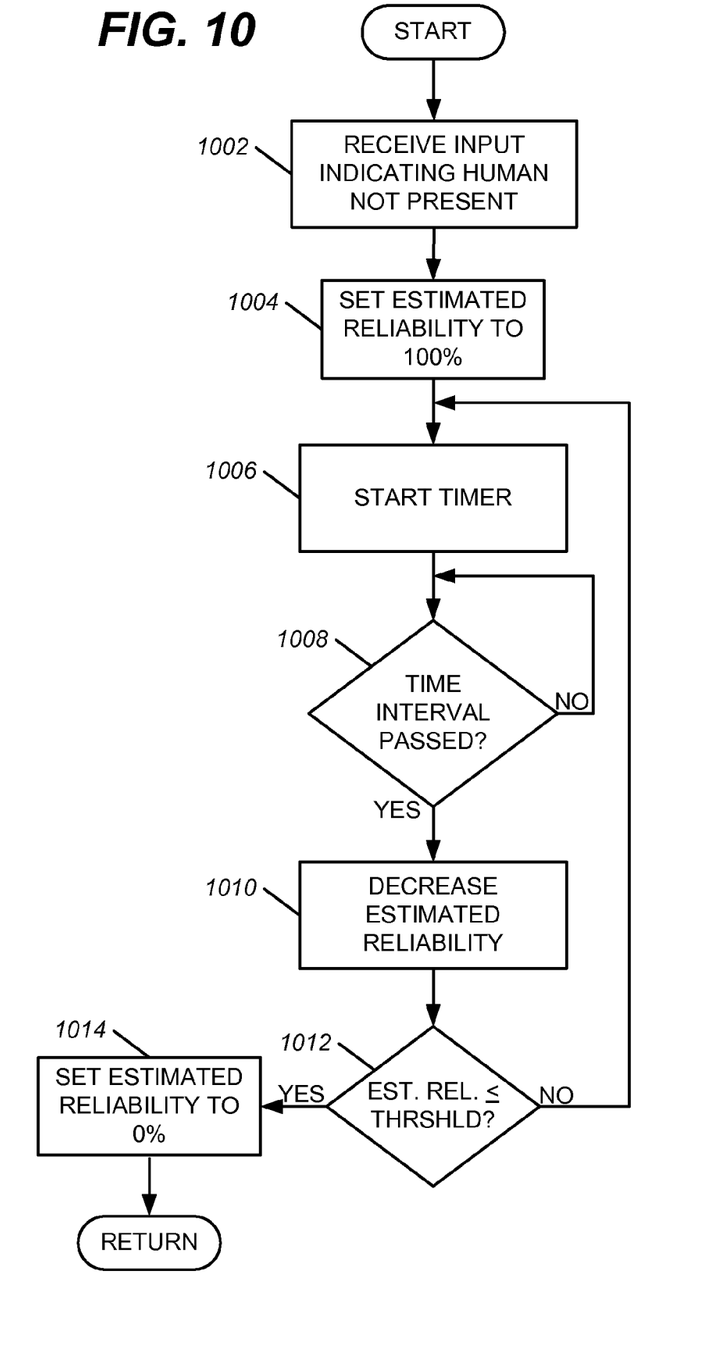

FIG. 10 is a flowchart illustrating an exemplary process which may be performed by a computing device in some embodiments. The process may begin with receiving an input indicating that a human being is not present (act 1002). In some embodiments, some of the inputs may indicate that a human being is not present. One example includes, but is not limited to, an input indicating that the computing device or workstation is locked by a user. After receiving the input, the computing device may set a corresponding estimated reliability of the input to 100% or another value (act 1004), thus indicating that a completely reliable input is received indicating that a human being is present within a proximity of the computing device.

The computing device may then start a timer to time a timer interval (act 1006). The timer interval may be 10 seconds, 30 seconds, one minute, two minutes, or another value. The computing device may then determine whether the timer interval has passed (i.e., the timer expired) (act 1008). If the timer interval expired, then the computing device may decrease the corresponding estimated reliability of the input by a given amount, such as, for example, 1%, 5%, 10%, or another given amount (act 1010).

The computing device may then determine whether the corresponding estimated reliability of the input is less than or equal to a threshold value (act 1012). The threshold value may be 50%, 55%, or another value. If the corresponding estimated reliability is determined to be less than or equal to the threshold value, then the corresponding estimated reliability may be set to 0 (act 1014) and the process may be completed. Otherwise, the computing device may repeat acts 1006-1012.

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Other configurations of the described embodiments are part of the scope of this disclosure. For example, in other embodiments, an order of acts performed by a process may be different and/or may include additional or other acts. In some embodiments, one or more of the inputs may have a higher priority than others of the inputs, such that an input having the higher priority may cause a lower priority input to be discarded. In some other embodiments, a user may be permitted to configure one or more of the inputs to be discarded when determining whether a human being is or is not present. Such a feature may be useful when the user wishes to discard an input from a source that is defective and falsely indicates that a human being is present or not present.

Accordingly, the appended claims and their legal equivalents define embodiments, rather than any specific examples given.

We claim as our invention:

1. A machine-implemented method of detecting a presence or an absence of a human being, the machine-implemented method comprising:
   aggregating a plurality of inputs, at least one of the plurality of inputs being from a human presence sensor for detecting the presence or the absence of the human being within a given proximity of a computing device;
   discarding a set of said plurality of inputs having a reliability less than a threshold value;
   obtaining corresponding estimated probabilities of the presence of the human being from the undiscarded inputs that indicate the presence of the human being;
   determining that the human being is present when any of the obtained estimated probabilities is greater than a predetermined value; and
   causing a computing device to behave in a predetermined manner when the determining determines that the human being is absent, wherein
   the machine-implemented method is performed by the computing device.

2. The machine-implemented method of claim 1, wherein the human presence sensor provides an input indicating one of a group, said group comprising: present, not-present, and unknown.

3. The machine-implemented method of claim 1, wherein: the human presence sensor performs reflective infrared proximity and presence detection.

4. The machine-implemented method of claim 3, wherein the corresponding estimated probability of the presence of the human being, with respect to the human presence sensor, is 100% when the input from the human presence sensor indicates that the human being is present.

5. The machine-implemented method of claim 1, wherein:
   at least a second one of the plurality of inputs is from a touch input device,
   the corresponding estimated probability of the presence of the human being, with respect to the at least a second one of the plurality of inputs, deteriorates over time after the at least a second one of the plurality of inputs provides an input indicating that the human being is present.

6. The machine-implemented method of claim 1, wherein at least a second one of the plurality of inputs is from an orientation sensor, and
   the corresponding estimated probability of the presence of the human being, with respect to the at least a second one of the plurality of inputs, deteriorates over time after the at least a second one of the plurality of inputs provides an input indicating a change in orientation.

7. The machine-implemented method of claim 1, wherein at least a second one of the plurality of inputs is provided by an application, and
   the corresponding estimated probability of the presence or the absence of the human being, with respect to the at least a second one of the plurality of inputs, deteriorates over time after the application provides the at least a second one of the plurality of inputs.

8. A computing device comprising:
   at least one processor; and
   a memory connected to the at least one processor;
   at least one item from a group consisting of a memory and a combination of the memory and at least one hardware logic component, the at least one item being configured to cause the computing device to perform a method comprising:
   aggregating a plurality of inputs, at least one of the plurality of inputs being from a respective human presence sensor for detecting a presence or an absence of a human being within a given proximity of the computing device;
   discarding a set said plurality of inputs having a reliability less than a threshold value;
   determining whether the human being is present or absent, the determining determines that the human being is present when any of the undiscarded inputs indicates that the human being is present; and
   causing the computing device to perform one or more actions when the human being is either determined to be present or is determined to be absent.

9. The computing device of claim 8, wherein the respective human presence sensor provides an input indicating one from a group consisting of present, not present, and unknown.

10. The computing device of claim 8, wherein the human presence sensor performs reflective infrared proximity and presence detection.

11. The computing device of claim 8, wherein at least a second one of the inputs is from an application.

12. The computing device of claim 8, wherein the at least some of the plurality of inputs are from devices including one or more devices from a group consisting of a touch input device and an orientation sensor.

13. A machine-implemented method of detecting a presence or an absence of a human being, the machine-implemented method comprising:
   aggregating a plurality of inputs, at least one of the plurality of inputs being from a human presence sensor for detecting the presence or the absence of the human being within a given proximity of a computing device;
   obtaining corresponding estimated probabilities of the presence of the human being with respect to ones of the plurality of inputs that indicate the presence of the human being;
   determining that the human being is present when any of the obtained estimated probabilities is greater than a predetermined value, wherein the reliability of at least some of the plurality of inputs deteriorates over a predetermined time period after detection of the human being; and the determining whether the human being is present or absent further comprises discarding ones of the at least some of the plurality of inputs having a reliability less than a threshold value when performing the determining; and
   causing a computing device to behave in a predetermined manner when the determining determines that the human being is absent, wherein the machine-implemented method is performed by the computing device.

14. The machine-implemented method of claim 13, wherein the human presence sensor provides an input indicating one of a group, said group comprising: present, not-present, and unknown.

15. The machine-implemented method of claim 13, wherein: the human presence sensor performs reflective infrared proximity and presence detection.

16. The machine-implemented method of claim 15, wherein
the corresponding estimated probability of the presence of the human being, with respect to the human presence sensor, is 100% when the input from the human presence sensor indicates that the human being is present.

17. The machine-implemented method of claim 13, wherein:
at least a second one of the plurality of inputs is from a touch input device,
the corresponding estimated probability of the presence of the human being, with respect to the at least a second one of the plurality of inputs, deteriorates over time after the at least a second one of the plurality of inputs provides an input indicating that the human being is present.

18. The machine-implemented method of claim 13, wherein
at least a second one of the plurality of inputs is from an orientation sensor, and
the corresponding estimated probability of the presence of the human being, with respect to the at least a second one of the plurality of inputs, deteriorates over time after the at least a second one of the plurality of inputs provides an input indicating a change in orientation.

19. The machine-implemented method of claim 13, wherein
at least a second one of the plurality of inputs is provided by an application, and
the corresponding estimated probability of the presence or the absence of the human being, with respect to the at least a second one of the plurality of inputs, deteriorates over time after the application provides the at least a second one of the plurality of inputs.

20. A computing device comprising:
at least one processor; and
a memory connected to the at least one processor;
at least one item from a group consisting of a memory and a combination of the memory and at least one hardware logic component, the at least one item being configured to cause the computing device to perform a method comprising:
aggregating a plurality of inputs, at least one of the plurality of inputs being from a respective human presence sensor for detecting a presence or an absence of a human being within a given proximity of the computing device;
determining whether the human being is present or absent, the determining determines that the human being is present when any of the at least one of the plurality of inputs indicates that the human being is present, wherein the reliability of at least some of the plurality of inputs deteriorates over a predetermined time period after detection of the human being; and the determining whether the human being is present or absent further comprises discarding ones of the at least some of the plurality of inputs having a reliability less than a threshold value when performing the determining; and
causing the computing device to perform one or more actions when the human being is either determined to be present or is determined to be absent.

21. The computing device of claim 20, wherein the respective human presence sensor provides an input indicating one from a group consisting of present, not present, and unknown.

22. The computing device of claim 20, wherein the human presence sensor performs reflective infrared proximity and presence detection.

23. The computing device of claim 20, wherein at least a second one of the inputs is from an application.

24. The computing device of claim 20, wherein the at least some of the plurality of inputs are from devices including one or more devices from a group consisting of a touch input device and an orientation sensor.

* * * * *